H. MAYER.
Socket for Tent-Poles.
No. 224,200. Patented Feb. 3, 1880.
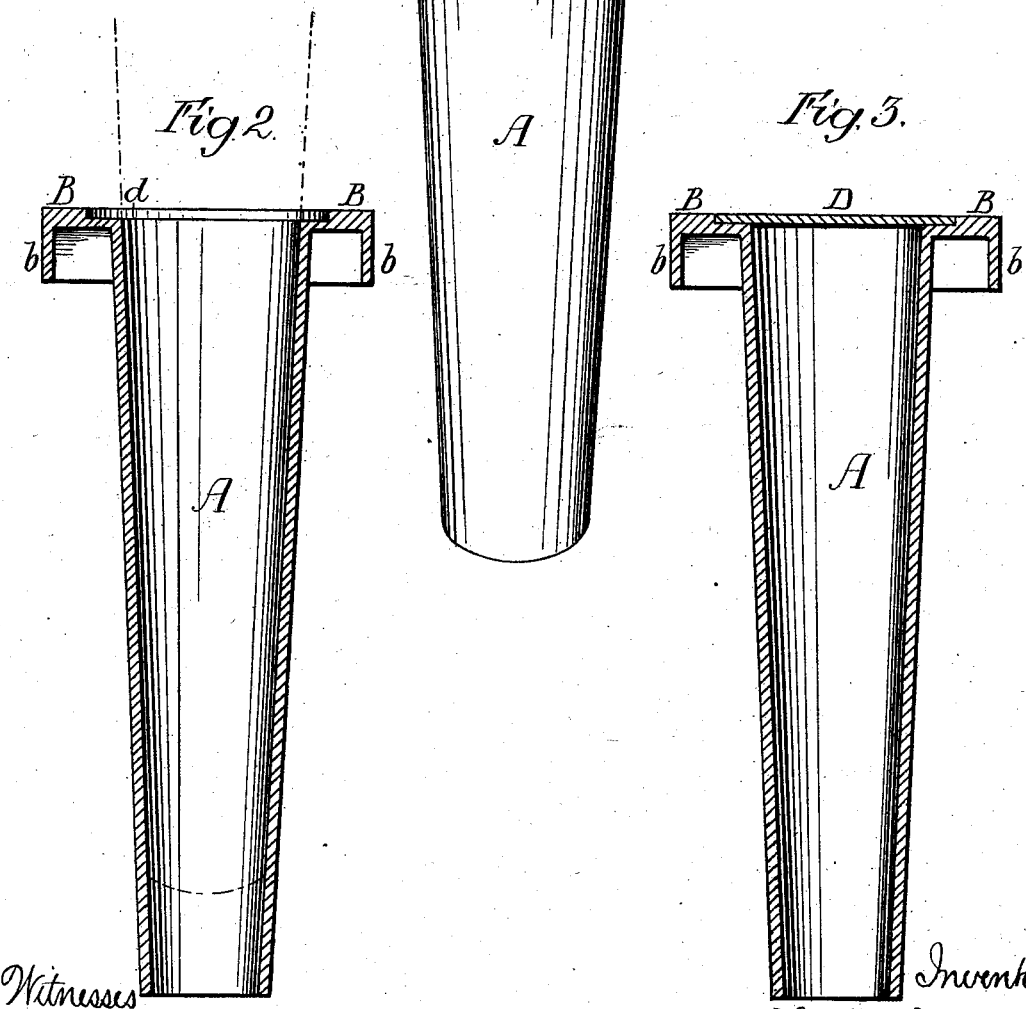

UNITED STATES PATENT OFFICE.

HENRY MAYER, OF HEIDELBERG, GERMANY.

SOCKET FOR TENT-POLES.

SPECIFICATION forming part of Letters Patent No. 224,200, dated February 3, 1880.

Application filed December 1, 1879.

*To all whom it may concern:*

Be it known that I, HENRY MAYER, of Heidelberg, in the Empire of Germany, have invented a new and useful Improved Socket for Tent-Poles, &c., of which the following is a specification.

The object of my invention is to construct an improved socket or shoe by the aid of which posts and poles can be readily and securely fixed in the ground, and as readily removed, without injuring the wood; and this object I attain by constructing a tapering cast-iron socket with a flange at its upper end, having a projecting rim at its outer edge and a detachable lid, my invention being more especially intended for use in connection with the posts of tents, pavilions, and like portable structures, so that they may be quickly and easily put up and taken down.

In the accompanying drawings, Figure 1 is a perspective view of the socket; Fig. 2, a vertical section of the socket containing a tent-pole; and Fig. 3, a similar view, showing the pole removed and the detachable lid in place.

The socket consists of a conical tapering iron tube, A, with a square collar or flange, B, provided with a downwardly-projecting rim, b, around its outer edge, so that when the socket is driven into the ground the flange, with its rim, prevents the socket from sinking too far and assists in keeping it firm and steady. The tapering tube, flange, and rim are cast in one piece, and a seat, d, is formed in the top of the flange, around the upper end of the socket-opening, for the reception of a detachable lid, D. The end of the post to be fitted into the socket is made tapering to fit the same, and is left somewhat shorter, so as to prevent the wood from getting wet. When the post has been removed from its shoe or socket the lid D is put in place, so as to prevent water or dirt from getting into the tube.

I am aware that it has been proposed to combine a fence-post with a socket and a separate flanged plate, through which the socket is arranged to pass; but in my device the socket, flange, and rim are all cast in one piece, so that it is easier and more economical to make, more convenient to handle and apply, and much more firm and secure when in use than the socket with the separate flanged plate.

I claim as my invention—

1. The within-described socket or shoe, consisting of a tapering tube having a flange, B, with a rim, b, all made in one piece.

2. The combination of the socket, consisting of the tube and flange, with a detachable lid, as and for the purpose set forth.

In testimony whereof I have signed my name to this specification in the presence of two subscribing witnesses.

HENRY MAYER.

Witnesses:
 FRIEDRICH TAEGER,
 JOSEPH PATRICK.